United States Patent
Ito et al.

(10) Patent No.: US 11,706,352 B2
(45) Date of Patent: Jul. 18, 2023

(54) COLOR EXPRESSION CONVERSION APPARATUS FOR UNDERSTANDING COLOR PERCEPTION IN DOCUMENT USING TEXTUAL, EXPRESSION AND NON-TRANSITORY COMPUTER READABLE MEDIUM STORING PROGRAM

(71) Applicant: FUJIFILM Business Innovation Corp., Tokyo (JP)

(72) Inventors: Yasushi Ito, Kanagawa (JP); Tomoyuki Shimizu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 392 days.

(21) Appl. No.: 16/209,982

(22) Filed: Dec. 5, 2018

(65) Prior Publication Data

US 2019/0230252 A1    Jul. 25, 2019

(30) Foreign Application Priority Data

Jan. 25, 2018  (JP) .............................. JP2018-010923

(51) Int. Cl.
*H04N 1/00* (2006.01)
*H04N 1/60* (2006.01)
*G06V 10/56* (2022.01)
*G06V 30/40* (2022.01)
*G06V 30/414* (2022.01)

(52) U.S. Cl.
CPC ......... *H04N 1/00129* (2013.01); *G06V 10/56* (2022.01); *G06V 30/40* (2022.01); *G06V 30/414* (2022.01); *H04N 1/00236* (2013.01); *H04N 1/603* (2013.01)

(58) Field of Classification Search
None
See application file for complete search history.

(56) References Cited

U.S. PATENT DOCUMENTS

| | | | | |
|---|---|---|---|---|
| 7,605,930 | B2 * | 10/2009 | Suzuki | G06T 5/008 358/1.14 |
| 8,390,907 | B2 | 3/2013 | Shibusawa | |
| 8,941,900 | B2 * | 1/2015 | Ohk | H04N 1/6072 358/1.9 |

(Continued)

FOREIGN PATENT DOCUMENTS

| | | | |
|---|---|---|---|
| JP | 2001-257867 | * | 9/2001 |
| JP | 2001257867 | | 9/2001 |

(Continued)

OTHER PUBLICATIONS

"Office Action of Japan Counterpart Application", dated Dec. 21, 2021, with English translation thereof, p. 1-p. 38.

(Continued)

*Primary Examiner* — Miya J Williams
*Assistant Examiner* — Pawan Dhingra
(74) *Attorney, Agent, or Firm* — JCIPRNET

(57) ABSTRACT

A color expression conversion apparatus includes a color expression conversion rule storage unit that stores a rule for converting a textual expression of a specific color into another textual expression, and a color expression conversion control unit that converts a textual expression of a color included in document data into another textual expression in accordance with the rule.

19 Claims, 14 Drawing Sheets

(56) References Cited

U.S. PATENT DOCUMENTS

| | | | | |
|---|---|---|---|---|
| 2004/0027594 | A1* | 2/2004 | Suzuki | G06T 5/003 358/1.9 |
| 2008/0246991 | A1* | 10/2008 | Haneda | G06Q 10/10 358/1.15 |
| 2010/0053656 | A1* | 3/2010 | Oota | G09B 21/008 358/1.11 |
| 2010/0245861 | A1* | 9/2010 | Shibusawa | H04N 1/40012 358/1.9 |
| 2019/0156544 | A1* | 5/2019 | Tsuboi | G06F 40/157 |

FOREIGN PATENT DOCUMENTS

| | | | | |
|---|---|---|---|---|
| JP | 2001293926 | | 10/2001 | |
| JP | 2004-361857 | * | 12/2004 | |
| JP | 2004361857 | | 12/2004 | |
| JP | 2010232736 | | 10/2010 | |
| JP | 2011-066523 | * | 3/2011 | H04N 1/6072 |
| JP | 2011066523 | | 3/2011 | |
| JP | 2019096042 | | 6/2019 | |

OTHER PUBLICATIONS

Office Action of Japan Counterpart Application, with English translation thereof, dated Jul. 5, 2022, pp. 1-4.

* cited by examiner

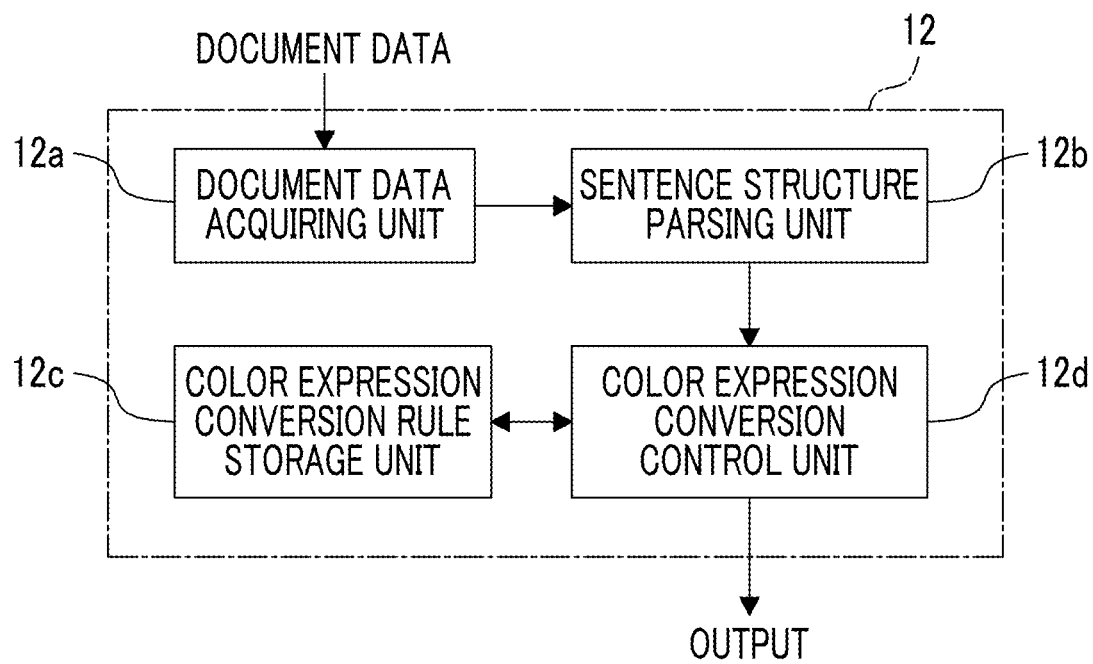

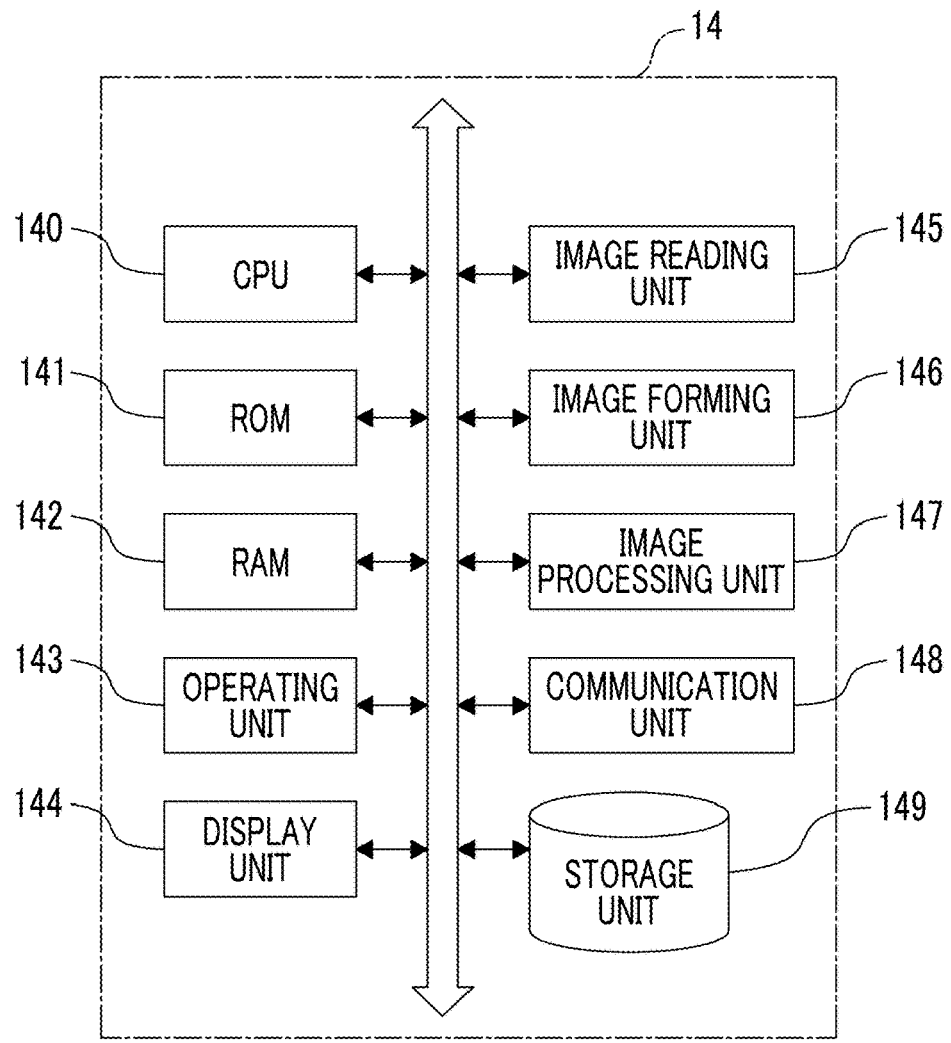

| TARGET FOR COLOR CONVERSION | AFTER COLOR CONVERSION |
|---|---|
| RGB OF VIOLET | RGB OF YELLOW |
| ...... | ...... |
| ...... | ...... |

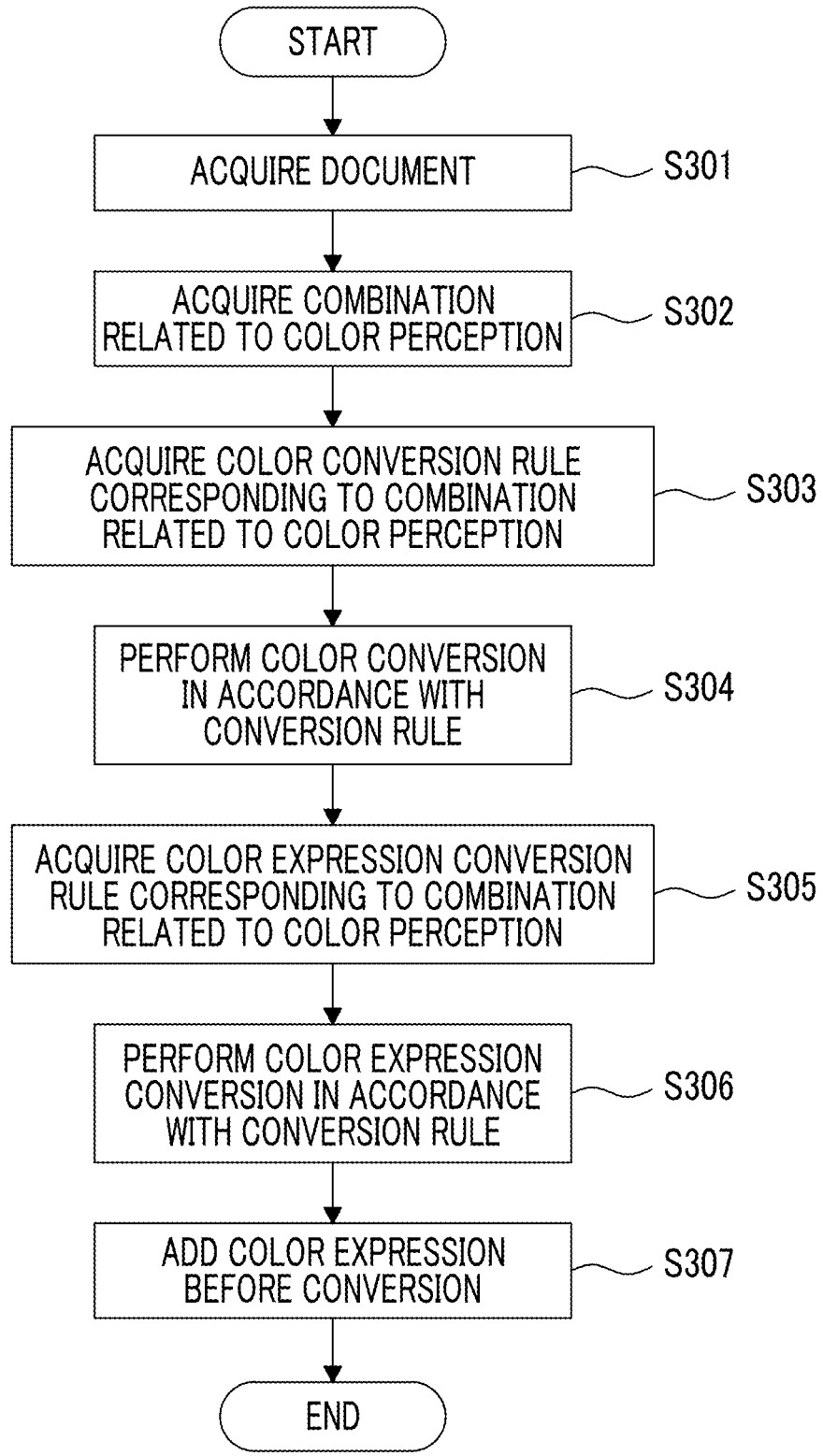

FIG. 15A

PART WITH (ORIGINALLY VIOLET) YELLOW TEXT IS SUBJECT TO CHANGE

FIG. 15B

(ORIGINALLY VIOLET)
PART WITH YELLOW TEXT IS SUBJECT TO CHANGE

FIG. 15C

PART WITH YELLOW TEXT IS SUBJECT TO CHANGE
(ORIGINALLY VIOLET)

FIG. 15D

*  ORIGINALLY VIOLET
PART WITH YELLOW TEXT IS SUBJECT TO CHANGE

FIG. 15E

VIOLET
PART WITH YELLOW TEXT IS SUBJECT TO CHANGE

COLOR EXPRESSION CONVERSION APPARATUS FOR UNDERSTANDING COLOR PERCEPTION IN DOCUMENT USING TEXTUAL, EXPRESSION AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-010923 filed Jan. 25, 2018.

BACKGROUND

(i) Technical Field

The present invention relates to a color expression conversion apparatus and a non-transitory computer readable medium storing a program.

(ii) Related Art

JP2011-66523A discloses an information processing apparatus that enables a person having normal color perception to not feel uncomfortable in a case where color identification information for a person having color weakness is added to a color image. An image data acquiring unit acquires color image data from an image layer. A correspondence information acquiring unit acquires color information at a specified position of the image on the image layer and converts the color information into a color name in a color palette. An insertion form determining unit arranges the previously acquired color name at a specified position on an information insertion layer. That is, the color information is extracted from the image data of the image layer, and the color information is converted into a color name. Then, the extracted color name is inserted on the information insertion layer without changing the image of the image layer.

JP2004-361857A discloses a printing method of printing a map that is easily recognized regardless of the presence of color blindness or color weakness. The printing method uses a map information database, a color information correction definition database, and a specific information content change definition database. The map information database stores path information, landmark information, and color information. In a case where a hue of specific information in the map information database has a possibility of causing difficulty in color perception, the color information correction definition database changes the hue information to another color information. In a case where a content of the specific information in the map information database has a possibility of causing difficulty in color perception, the specific information content change definition database changes the content of the specific information to another specific information. In a case where the map is printed using the path information, the landmark information, the color information, and the specific information stored in the map information database, printing is performed by converting a hue and specific information having a possibility of causing a difficulty in color perception into a hue and specific information that enables the content of the map to be identified regardless of the presence of difficulty in color perception.

SUMMARY

While a technology for converting a hue of an image or a text into an easily recognizable hue for a person having difficulty in color perception is suggested, expressing color (for example, a textual expression of a hue such as "red" or "red color") in a document is not considered.

Aspects of non-limiting embodiments of the present disclosure relate to a color expression conversion apparatus and a non-transitory computer readable medium storing a program.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a color expression conversion apparatus including a color expression conversion rule storage unit that stores a rule for converting a textual expression of a specific color into another textual expression, and a color expression conversion control unit that converts a textual expression of a color included in document data into another textual expression in accordance with the rule.

BRIEF DESCRIPTION OF THE DRAWINGS

Exemplary embodiment(s) of the present invention will be described in detail based on the following figures, wherein:

FIG. 3 is a function block diagram of the server of Exemplary Embodiment 1;

FIG. 4 is a configuration block diagram of an image forming apparatus of Exemplary Embodiment 1;

FIG. 5 is a descriptive diagram of a color expression conversion rule of Exemplary Embodiment 1;

FIG. 14 is an overall process flowchart of Exemplary Embodiment 3;

FIGS. 15A to 15E are descriptive diagrams of an additional expression accompanied by the color expression conversion process of Exemplary Embodiment 3;

DETAILED DESCRIPTION

Hereinafter, exemplary embodiments of the present invention will be described based on the drawings.

Exemplary Embodiment 1

Figure 1:
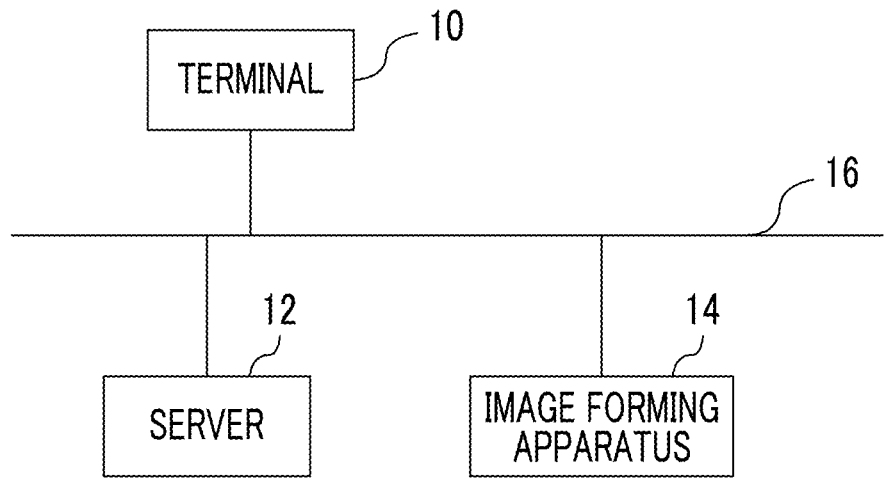
FIG. 1 is a system configuration diagram of Exemplary Embodiment 1.

FIG. 1 illustrates a system configuration diagram of the present exemplary embodiment. The system includes a terminal 10, a server 12, and an image forming apparatus 14. The terminal 10, the server 12, and the image forming apparatus 14 are connected to each other through a communication network 16 in a manner capable of transmitting and receiving data.

The terminal 10 transmits document data to be formed as an image (printed) by the image forming apparatus 14 to the server 12 through the communication network 16.

The server 12 is, for example, a management server or a cloud server and functions as a color expression conversion apparatus. The server 12 receives the document data from the terminal 10 through the communication network 16, and determines whether or not to execute a color expression conversion process on the document data. In a case where the server 12 determines to execute the color expression conversion process, the server 12 executes the conversion process on a specific color expression in the document data, and then, transmits the document data to the image forming apparatus 14 through the communication network 16. In addition, in a case where the server 12 determines not to execute the color conversion process, the server 12 transmits the document data to the image forming apparatus 14 through the communication network 16 without executing the color expression conversion process on the document data. The server 12 determines whether or not to execute the color conversion process depending on a user of the document data, that is, a user of the document data that is printed and output in the image forming apparatus 14. For example, by using user information, the server 12 does not execute the color expression conversion process in a case where the user of the document data printed and output in the image forming apparatus 14 is a person having normal color perception, and executes the color expression conversion process in a case where the user is a person having difficulty in color perception. In addition, the user may provide an instruction to execute or not execute the color conversion process on an operating screen of the image forming apparatus 14. Information related to the user of the document data printed and output in the image forming apparatus 14 may be determined based on the user information that is added to the document data, or may be determined based on the user information that is transmitted from the image forming apparatus 14. In a case where the user information related to the user of the document data printed and output in the image forming apparatus 14 is added to the document data, the default may be a person having normal color perception, and specific information may be added only in the case of a person having difficulty in color perception.

The "color expression" means a textual expression of a hue and is, for example, "red". It does not matter whether the color expression is in any language, and also whether the color expression is in katakana, hiragana, or kanji. In addition, the "color expression conversion" means replacing a textual expression of a certain color with another textual expression of another color. For example, the textual expression "red" is replaced with a textual expression "brown".

The image forming apparatus 14 receives the document data from the server 12 through the communication network 16, and performs a printing process on the document data to output the document data. The image forming apparatus 14 may be a so-called multifunction peripheral that has, for example, a scanning function, a printing function, a copying function, and a facsimile function. The document data from the server 12 is either document data on which the color expression conversion process is executed, or document data on which the color expression conversion process is not executed.

The communication network 16 is a local area network (LAN), a wide area network (WAN), or the like and may be either a wired network or a wireless network. In addition, the communication network 16 may be a dedicated line or a public line such as the Internet. The communication network 16 may be configured with multiple networks.

The document data may not be transmitted to the server 12 from the terminal 10. Instead, the document data may be transmitted to the server 12 from the image forming apparatus 14.

In addition, the color expression conversion process may not be executed by determining whether or not to execute the color expression conversion process on the document data in the server 12. Instead, the color expression conversion process may be executed by determining whether or not to execute the color expression conversion process in the image forming apparatus 14. In addition, the color expression conversion process may be executed in the image forming apparatus 14. In this case, the image forming apparatus 14 functions as the color expression conversion apparatus. That is, the color expression conversion apparatus may be implemented with any of the server 12 or the image forming apparatus 14.

Figure 2:
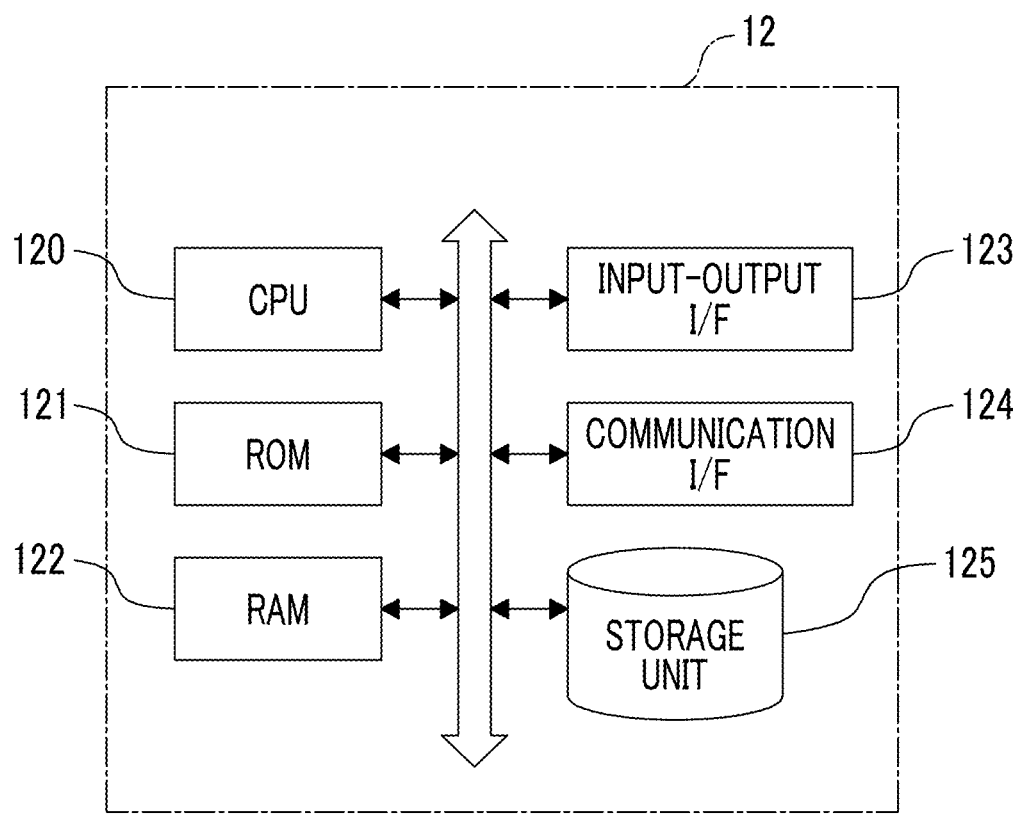
FIG. 2 is a configuration block diagram of a server of Exemplary Embodiment 1.

FIG. 2 illustrates a configuration block diagram of the server 12 in FIG. 1. The server 12 has a configuration as a server computer, and includes one or multiple central processing units (CPU) 120, a read only memory (ROM) 121, a random access memory (RAM) 122, an input-output interface (I/F) 123, a communication I/F 124, and a storage unit 125. These configuration blocks are connected to a bus, and transmits and receives data through the bus.

The CPU 120 executes various programs such as an operating system (OS) and applications. In addition, the ROM 121 stores a control program that is executed by the CPU 120. The RAM 122 is used as a work memory or the like of the CPU 120. The CPU 120 reads the control program stored in the ROM 121, and executes the control program using the RAM 122 as a work area. In a case where the control program is executed by the CPU 120, various functions including, particularly, the color expression conversion process in the server 12 are implemented.

The input-output I/F 123 is connected to an input device such as a keyboard or a mouse, and an output device (display device) such as a display. The input-output I/F 123 generally receives input of a color expression conversion rule and stores the color expression conversion rule in the storage unit 125.

The communication I/F 124 transmits and receives data with the terminal 10 and the image forming apparatus 14 through the communication network 16. The communication I/F 124 receives the document data transmitted from the terminal 10, and outputs the document data processed in the CPU 120, that is, the document data on which the color expression conversion process is executed, or the document data on which the color expression conversion process is not executed, to the image forming apparatus 14. The communication I/F 124 may receive input of the color expression conversion rule and store the color expression conversion rule in the storage unit 125 instead of the input-output I/F 123 or along with the input-output I/F 123.

The storage unit 125 has a storage area such as a hard disk drive (HDD) or a solid state drive (SSD), and stores the color expression conversion rule that is referred to by the CPU 120 at the time of executing the color expression conversion process. The storage unit 125 may store the control program executed in the CPU 120.

FIG. 3 illustrates a function block diagram of the server 12. The server 12 includes a document data acquiring unit 12a, a sentence structure parsing unit 12b, a color expression conversion rule storage unit 12c, and a color expression conversion control unit 12d as function blocks.

The document data acquiring unit 12a acquires the document data transmitted from the terminal 10. The document data acquiring unit 12a may acquire the user information along with the document data. Attributes of the actual user of the document data, for example, whether the user is a person having normal color perception or a person having difficulty in color perception, may be specified by the user information.

The sentence structure parsing unit 12b executes sentence structure parsing on the acquired document data. That is, the sentence structure parsing unit 12b extracts text data in the document data, and performs sentence structure parsing on the extracted text data to decompose the text data into words associated with word class information. The sentence structure parsing unit 12b may use any sentence structure parsing method. For example, the sentence structure parsing unit 12b includes a parsing dictionary, a morpheme parsing unit, and a dependency parsing unit. The parsing dictionary is a dictionary that stores a word in association with information representing a grammatical role (for example, a word class) of the word, and stores a grammatical rule of the language (for example, Japanese) of the document data as a processing target. The morpheme parsing unit performs morpheme parsing on the document data by referring to the parsing dictionary. As a result of morpheme parsing, a sentence in the document data is decomposed into morphemes (words), and information that represents the word class of each word is acquired. The morpheme parsing unit may be implemented using well-known morpheme parsing software. For example, such software includes "JUMAN", "ChaSen", and "MeCab". The parsing dictionary is dictionary information that is configured to correspond to the morpheme parsing software implementing the morpheme parsing unit. The dependency parsing unit performs dependency parsing on the result of morpheme parsing using a predetermined sentence structure parsing rule. The dependency parsing unit gathers multiple words acquired as the result of morpheme parsing into a segment in accordance with the sentence structure parsing rule, and specifies a head of each segment.

The color expression conversion rule storage unit 12c stores, as a rule, a correspondence between a color expression as a target for color expression conversion and the color expression after color expression conversion. The color expression conversion rule may be defined in a table format but is not limited thereto. The color expression conversion rule may be defined in advance by a server manager and stored in the color expression conversion rule storage unit 12c. The server manager may update the color expression conversion rule by appropriately changing the color expression conversion rule.

The color expression conversion rule storage unit 12c stores a conversion rule for a person having difficulty in color perception, specifically, multiple color expression conversion rules corresponding to the types and degrees of color perception. Color is identified in a cone of an eye of a person. There are three types of cones including an L cell that reacts to light of a long wavelength, an M cell that reacts to light of a medium wavelength, and an S cell that reacts to light of a short wavelength. Color is identified by a brain that calculates a difference in reaction among the three types of cones. The color expression conversion rule storage unit 12c stores, for example, a color expression conversion rule for cones other than the L cone, a color expression conversion rule for cones other than the M cone, and a color expression conversion rule for cones other than the S cone. Each of the multiple color expression conversion rules is assigned an identification index that corresponds to the type and the degree of difficulty in color perception.

The color expression conversion control unit 12d determines whether or not the word that is associated with the word class information and extracted in the sentence structure parsing unit 12b matches a word defined in the color expression conversion rules stored in the color expression conversion rule storage unit 12c, and, in a case where a match is present, converts (replaces) the extracted word into another color expression in accordance with the color expression conversion rules. More specifically, in a case where the actual user of the document data printed and output in the image forming apparatus 14 is specified as a person having difficulty in color perception using the user information, the color expression conversion control unit 12d refers to the color expression conversion rule corresponding to the difficulty in color perception of the user, compares the word as a conversion target defined in the rule with the word extracted in sentence structure parsing, and converts (replaces) the extracted word into another color expression in accordance with the rule in a case where both match each other. For example, in a case where the user has monochromacy meaning a malfunction in the function of a visual cell (L cone) that is sensitive to red, a word "red" is converted into a word "brown". It should be noted that the color expression conversion control unit 12d converts a textual expression of a certain color into another textual expression without converting the hue (converting a certain color into another color).

Meanwhile, the color expression conversion control unit 12d does not execute color expression conversion in a case where the actual user of the document data printed and output in the image forming apparatus 14 is not specified as a person having difficulty in color perception using the user information, or in a case where the user is a person having difficulty in color perception, but the word that is associated with the word class information and extracted in the sentence structure parsing unit 12b does not match a word defined in the color expression conversion rules stored in the color expression conversion rule storage unit 12c. The color expression conversion control unit 12d outputs, to the image forming apparatus 14, the document data on which the color expression conversion process is performed, or the document data on which the color expression conversion process is not performed.

FIG. 4 illustrates a configuration block diagram of the image forming apparatus 14. The image forming apparatus 14 includes a central processing unit (CPU) 140, a read only memory (ROM) 141, a random access memory (RAM) 142, an operating unit 143, a display unit 144, an image reading unit 145, an image forming unit 146, an image processing unit 147, a communication unit 148, and a storage unit 149. These configuration blocks are connected to a bus, and transmits and receives data through the bus.

The CPU 140 executes various programs such as an operating system (OS) and applications. In addition, the ROM 141 stores a control program that is executed by the CPU 140. The RAM 142 is used as a work memory or the like of the CPU 140. The CPU 140 reads the control program stored in the ROM 141, and executes the control program using the RAM 142 as a work area. In a case where the control program is executed by the CPU 140, various functions in the image forming apparatus 14 are implemented.

The operating unit 143 receives an operation that is performed on the image forming apparatus 14 by the user. The operating unit 143 is configured with, for example, a touch panel that is configured with a hardware key and outputs a control signal corresponding to a contacted position. A unit that detects a contact is not limited. A unit that detects a pressure caused by a contact, a unit that detects static electricity of a contacted object, or the like may be used.

The display unit 144 is configured with, for example, a liquid crystal display or an organic EL display, and displays data related to the image forming apparatus 14. The display unit 144 displays a screen to be referred to by the user in a case where the user operates the image forming apparatus 14. The display unit 144 may be integrated with the operating unit 143.

The image reading unit 145 reads, from an original document set in an auto document feeder (ADF) or the like by the user, an image that is formed on the original document, and generates image data that indicates the read image. The image reading unit 145 is, for example, a scanner and may use a CCD system in which reflective light of light with which the original document is irradiated from a light source is concentrated by a lens and received by charge coupled devices (CCD), or a CIS system in which reflective light of light with which the original document is irradiated from LED light sources in order is received by a contact image sensor (CIS). In the case of transmitting the document data to the server 12 from the image forming apparatus 14, the image data generated in the image reading unit 145 may be transmitted to the server 12.

The image forming unit 146 includes a printing mechanism that forms an image on a recording medium such as paper. The image forming unit 146 is, for example, a printer and may use an electrophotographic system in which an image is formed by transferring toner attached to a photosensitive body to a recording medium, an ink jet system in which an image is formed by ejecting ink onto a recording medium, or a laser system.

The image processing unit 147 performs image processing such as color correction or tone correction on the image represented by the image data. The communication unit 148 is connected to the communication network 16 and communicates with the terminal 10 and the server 12.

The storage unit 149 has a storage area such as an HDD and stores data received in the communication unit 148, data generated in the image forming apparatus 14, and the like. The storage unit 149 may store the control program executed in the CPU 140.

As described above, the image forming apparatus 14 may function as the color expression conversion apparatus. In this case, the function blocks illustrated in FIG. 3 are executed in the CPU 140 of the image forming apparatus 14. The CPU 140 executes the color expression conversion process on the document data acquired from the terminal 10 or the image data acquired in the image reading unit 145 by determining whether or not to execute the color expression conversion process. In a case where the user logs in for using the image forming apparatus 14, the user inputs a user ID, a password, and the like. The CPU 140 may determine whether the user of the document data is a person having normal color perception or a person having difficulty in color perception using the user ID and the like at the time of logging in as the user information.

FIG. 5 illustrates one example of the color expression conversion rule stored in the color expression conversion rule storage unit 12c. The color expression conversion rule is illustrated as a table 18 that defines a correspondence between the target for color expression conversion and the target after color expression conversion. The target for color expression conversion is a word with which the word class information is associated, and is, for example, a noun "violet", "violet color", "red", or "red color", or an adjective "red". The target after color expression conversion is an expression after the word is replaced, and is a noun "blue", "brown", or "brown color", or an adjective "blue" or "brown". The correspondence is as follows.

violet, violet color→blue, blue color
red, red color→brown, brown color
red→brown This table corresponds to a type of color perception in which violet color is seen in blue color, and red color is seen in brown color. The color expression conversion control unit 12d executes the color expression conversion process using the color expression conversion rule that corresponds to the type and the degree of color perception of the user specified based on the user information.

Figure 6:
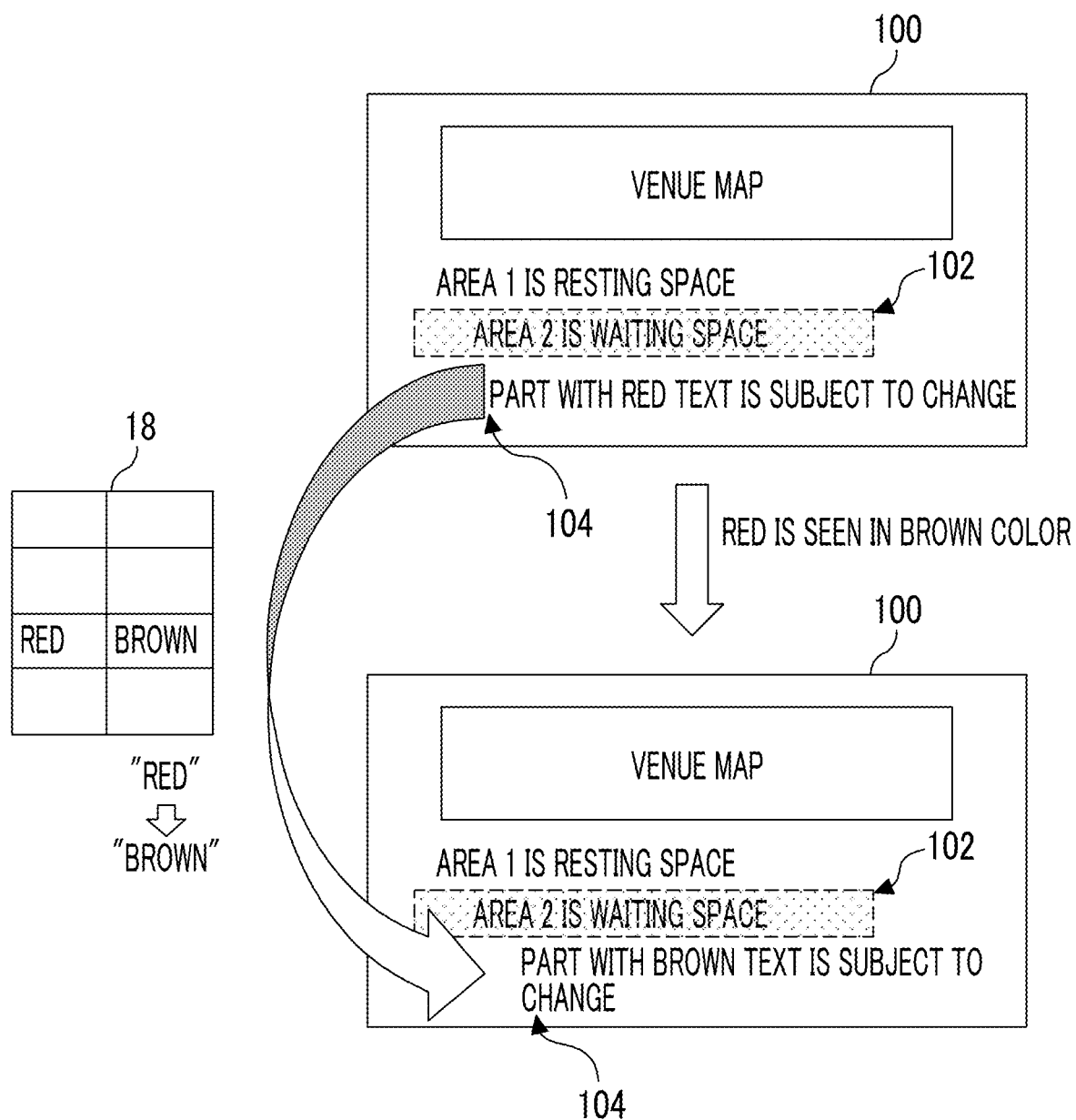
FIG. 6 is a descriptive diagram of a color expression conversion process of Exemplary Embodiment 1.

FIG. 6 schematically illustrates the color expression conversion process using the color expression conversion rule. Document data 100 that is transmitted from the terminal 10 includes map data as a venue map, and a description of each area illustrated in the venue map is included in the document data 100. The descriptions are illustrated as "area 1 is a resting space", "area 2 is a waiting space", and "part with red text is subject to change". The description "area 2 is a waiting space" is illustrated in red color. In FIG. 6, a dotted line hatched area 102 indicates a part in red color.

In the case of printing and outputting such document data in the image forming apparatus 14, a person having difficulty in specific color perception sees red color as brown color in a case where the person views the printed matter. Thus, the description "area 2 is awaiting space" is seen in brown color. Thus, even in a case where the description "part with red text is subject to change" is illustrated below the description "area 2 is a waiting space", there is no part with red text, and the person may be confused.

Therefore, the color expression conversion control unit 12d extracts a noun word "red" from the document data 100, and performs word replacement of "red"→"brown" by referring to the table 18 defining the color expression conversion rule. Accordingly, the word "red" is converted into a word "brown", and the description "part with red text is subject to change" is converted into a description "part with brown text is subject to change". In FIG. 6, it is noted that a color textual expression part 104 is converted from "red" into "brown". The image forming apparatus 14 prints and outputs the document data 100 in which the color expression is converted.

In a case where a person having difficulty in specific color perception views the printed matter, red color is seen in brown color. Thus, the description "area 2 is a waiting space" is seen in brown color. Since the description "part with brown text is subject to change" is illustrated below the description "area 2 is awaiting space", the color that is seen matches the color of the description.

Figure 7:
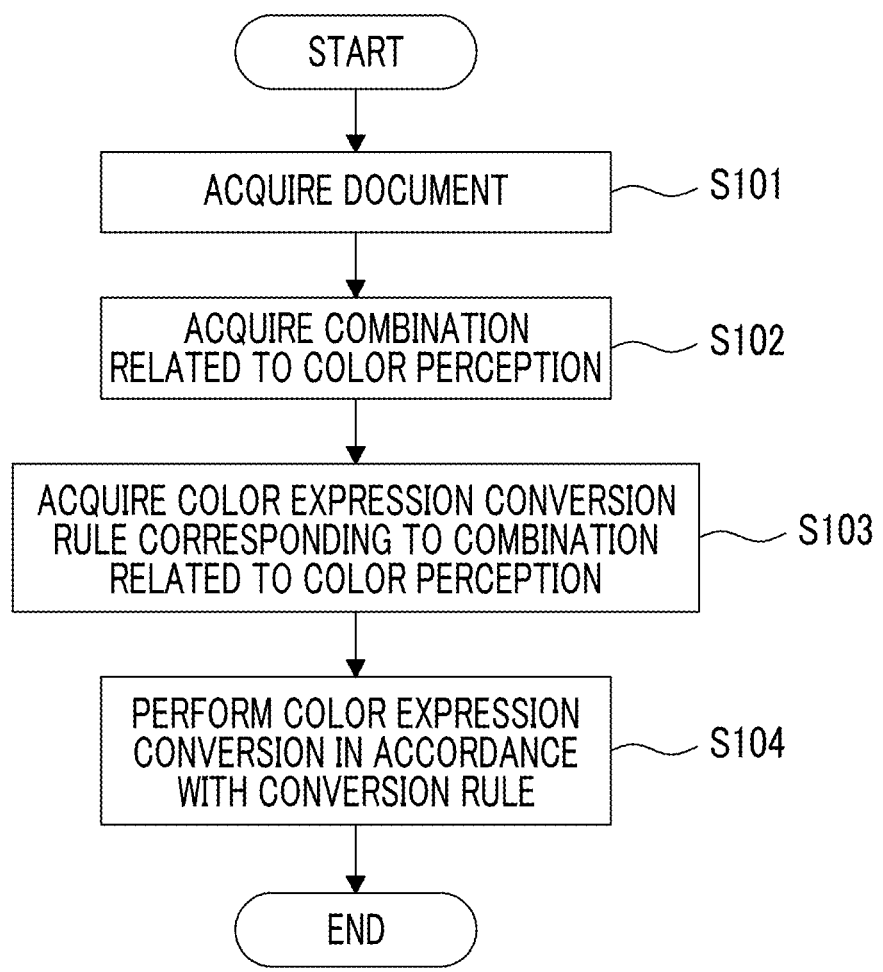
FIG. 7 is an overall flowchart of the color expression conversion process of Exemplary Embodiment 1.

FIG. 7 illustrates an overall process flowchart of the present exemplary embodiment. The process is executed in the server 12. In a case where the image forming apparatus 14 functions as the color expression conversion apparatus, the process is executed in the image forming apparatus 14. It is assumed that the server manager stores the color expression conversion rules in advance in the color expression conversion rule storage unit 12c.

In a case where the document data acquiring unit 12a acquires the document data (S101), a combination that is related to color perception of the user is acquired from the user information (for example, the user ID) that is associated with the document data (S102). The combination related to color perception means a combination of a category of color perception of the user assumed by a writer of the document and a category of color perception of the actual user of the document. Typically, the user of the document is assumed to be a person having normal color perception. The color expression does not need to be converted in a case where the actual user of the document is a person having normal color perception. In addition, it is considered that the user of the document is originally assumed to be a person having difficulty in specific color perception, and the color expression does not need to be converted in a case where the actual user is also a person having difficulty in specific color perception. The reason is that the creator of the document creates the document assuming that the actual user is a person having difficulty in color perception.

Meanwhile, in a case where the user of the document is assumed to be a person having normal color perception, but the actual user of the document is a person having difficulty in color perception, a color that the user actually sees is different from the textual expression of the color present in the document. Thus, the user may feel uncomfortable. Therefore, in this process, a combination in which color perception of the assumed user of the document data is different from color perception of the actual user is acquired. Specifically, the combination is as follows.

The assumed user is a person having normal color perception, and the actual user has monochromacy.

The assumed user is a person having normal color perception, and the actual user has dichromacy.

The assumed user has monochromacy, and the actual user has dichromacy, or the like.

Next, the color expression conversion control unit 12d acquires the color expression conversion rule corresponding to the combination related to color perception by referring to the color expression conversion rule storage unit 12c using the combination that is related to color perception and acquired in S102 (S103). For example, in a case where the combination related to color perception includes the assumed user as a person having normal color perception and the actual user as having monochromacy, the color expression conversion rule for monochromacy is acquired from the multiple color expression conversion rules (refer to FIG. 5).

The color expression conversion control unit 12d converts the color expression in the document data in accordance with the acquired color expression conversion rule, and outputs the document data to the image forming apparatus 14 (S104).

Figure 8:
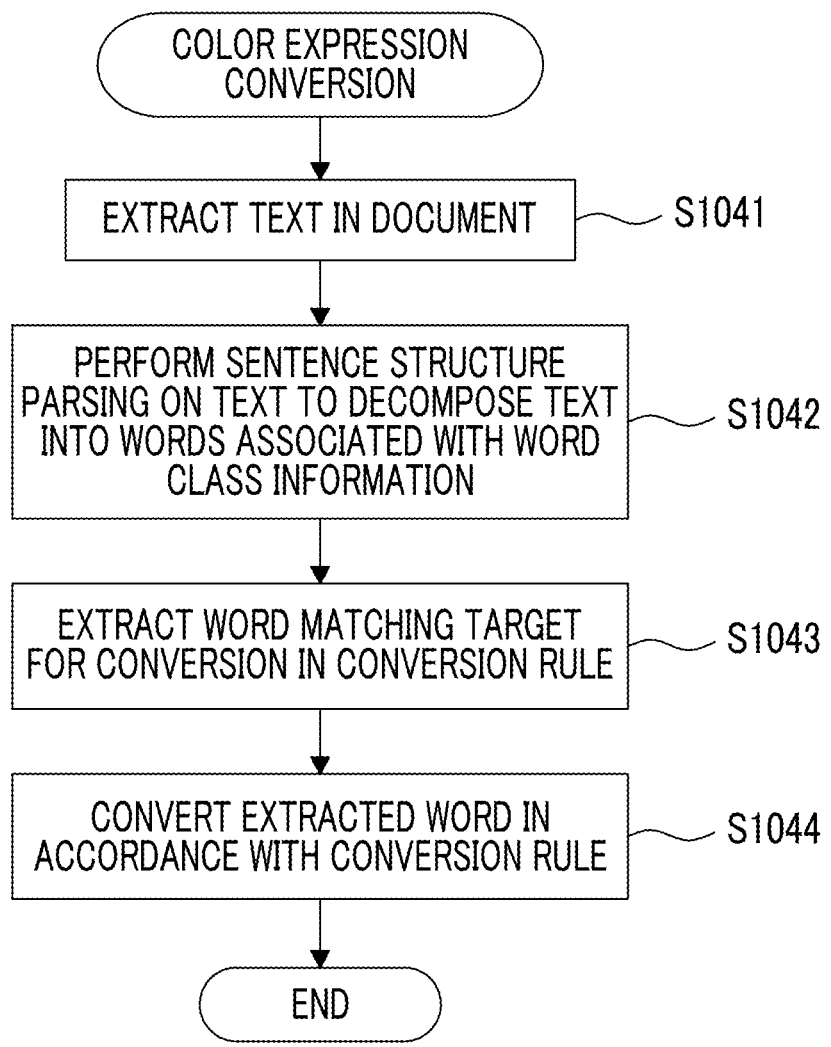
FIG. 8 is a detailed flowchart of the color expression conversion process of Exemplary Embodiment 1.

FIG. 8 illustrates a detailed flowchart of the color expression conversion process (S104) in FIG. 7.

First, the sentence structure parsing unit 12b extracts text data in the document data (S1041), and performs sentence structure parsing on the extracted text data to decompose the text data into words associated with the word class information (S1042).

Next, the color expression conversion control unit 12d compares the word acquired in the sentence structure parsing unit 12b with the word defined in the color expression conversion rule, and extracts a word that has a match in the color expression conversion rule (S1043). For example, in a case where the extracted word is a noun "area", "resting", "space", "waiting", "red", "text", "part", "change", or "possibility", the word "red" has a match in the table 18 defining the color expression conversion rule. Thus, the word "red" is extracted.

The color expression conversion control unit 12d converts the extracted word into another word in accordance with the color expression conversion rule (S1044). For example, conversion of "red"→"brown" is performed in accordance with the color expression conversion table 18.

In such a manner, the present exemplary embodiment focuses on a textual expression of a color in the document data, and converts the textual expression of the color into another textual expression. Thus, the color viewed by the user and the textual expression of the color matches.

Exemplary Embodiment 2

While the process of converting the color expression without converting the color in the document data is described in Exemplary Embodiment 1, the color may be converted. The case of converting the color and the color expression will be described in the present exemplary embodiment.

Figures 9, 10:
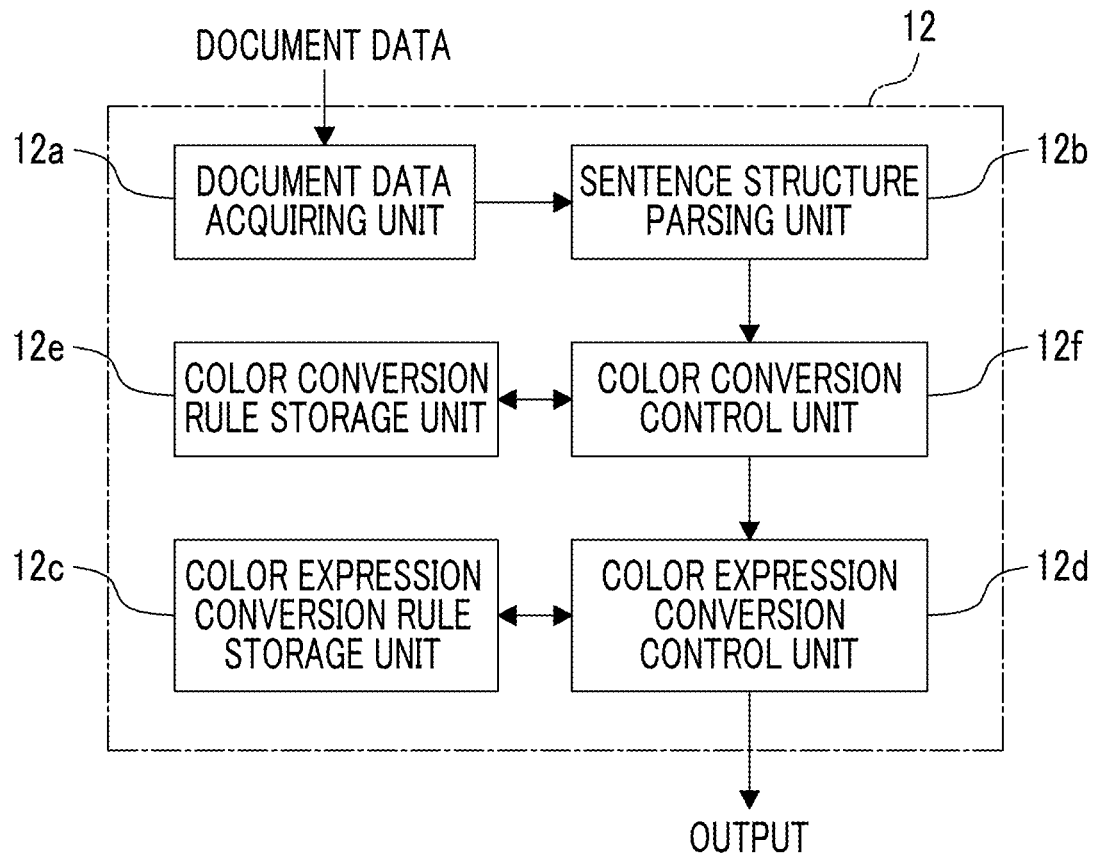
FIG. 9 is a function block diagram of a server of Exemplary Embodiment 2.
FIG. 10 is a descriptive diagram of a color conversion rule of Exemplary Embodiment 2.

FIG. 9 illustrates a function block diagram of the server 12 in the present exemplary embodiment. The server 12 includes a color conversion rule storage unit 12e and a color conversion control unit 12f as function blocks in addition to the document data acquiring unit 12a, the sentence structure parsing unit 12b, the color expression conversion rule storage unit 12c, and the color expression conversion control unit 12d.

The document data acquiring unit 12a acquires the document data transmitted from the terminal 10.

The sentence structure parsing unit 12b executes sentence structure parsing on the acquired document data. That is, the sentence structure parsing unit 12b extracts text data in the document data, and performs sentence structure parsing on the extracted text data to decompose the text data into words associated with word class information.

The color expression conversion rule storage unit 12c stores, as a rule, a correspondence between a color expression as a target for color expression conversion and the color expression after color expression conversion.

The color expression conversion control unit 12d determines whether or not the word that is associated with the word class information and extracted in the sentence structure parsing unit 12b matches a word defined in the color expression conversion rules stored in the color expression conversion rule storage unit 12c, and, in a case where a match is present, converts (replaces) the extracted word into another color expression in accordance with the color expression conversion rules.

The color conversion rule storage unit 12e stores, as a rule, a correspondence between a color of a target for color conversion and the color after color conversion. In the same manner as the color expression conversion rules, multiple types of color conversion rules corresponding to the types and degrees of difficulty in color perception are stored.

The color conversion control unit 12f determines whether or not a color included in the document data matches a color defined in the color conversion rules stored in the color conversion rule storage unit 12e, and converts the color into another color in accordance with the color conversion rules in a case where a match is present. The color included in the document data is acquired by causing the sentence structure parsing unit 12b to extract color information that is included in the document data.

In FIG. 9, the color conversion rule storage unit 12e and the color expression conversion rule storage unit 12c may be configured to be the same storage unit. In addition, the color expression conversion control unit 12d and the color conversion control unit 12f may be configured to be the same control unit.

In addition, in FIG. 9, while the color is converted in the color conversion control unit 12f, and then, the color expression is converted in the color expression conversion control unit 12d, the color expression may be converted in the color expression conversion control unit 12d, and then, the color may be converted in the color conversion control unit 12f. Alternatively, color conversion in the color conversion control unit 12f may be executed in parallel with color expression conversion in the color expression conversion control unit 12d.

FIG. 10 illustrates one example of the color conversion rules stored in the color conversion rule storage unit 12e. The color conversion rule is illustrated as a table 20 that defines a correspondence between a target for color conversion and the target after color conversion. The target for color conversion is, for example, RGB of violet. The target after color conversion is the color after the color is converted, and is, for example, RGB of yellow. The correspondence is as follows.

RGB of violet→RGB of yellow

This table corresponds to a type of color perception in which violet color is seen in blue color. The color conversion control unit 12f executes the color conversion process using the color conversion rule that corresponds to color perception of the actual user specified based on the user information.

Figure 11:
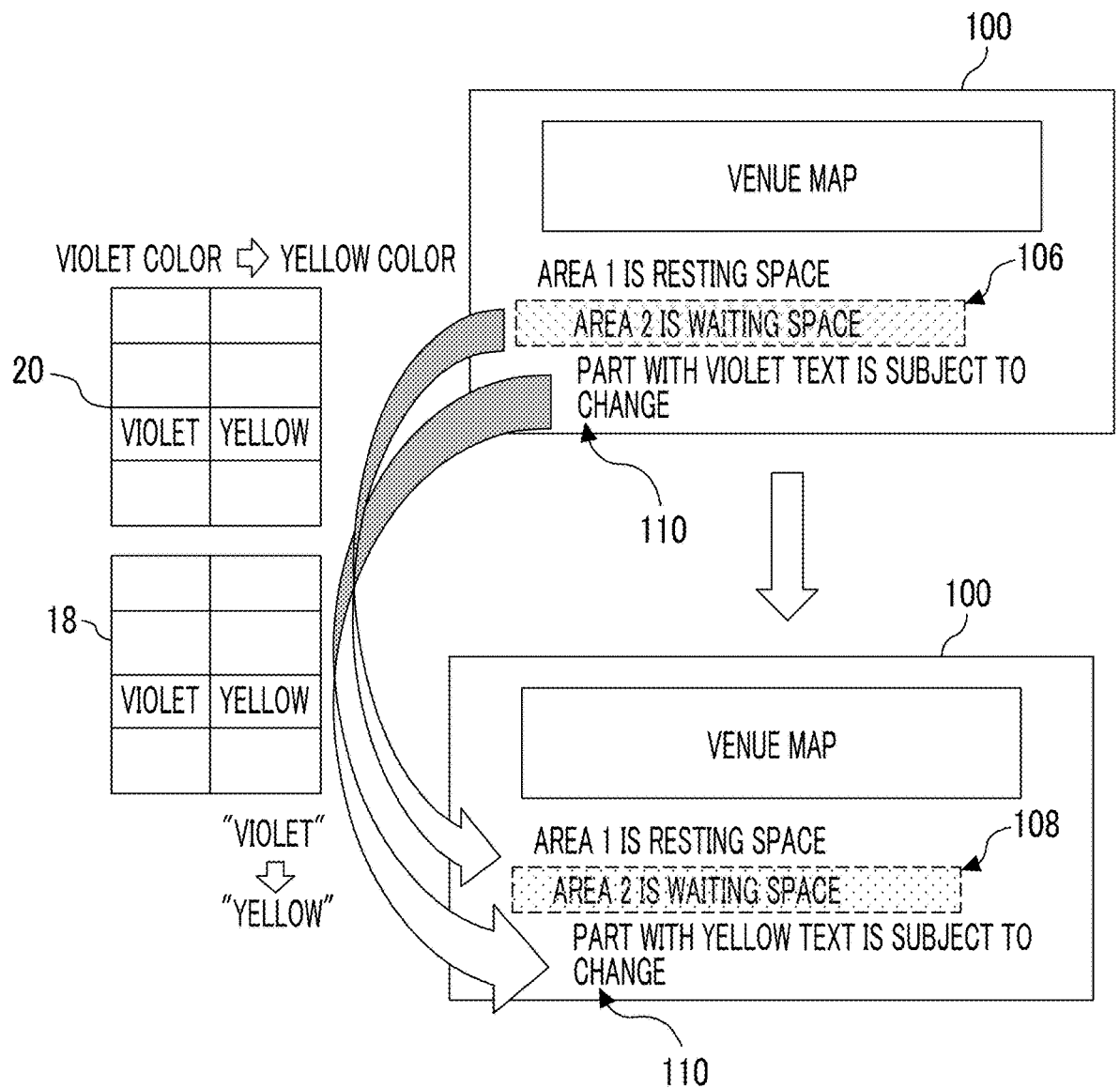
FIG. 11 is a descriptive diagram of a color conversion process and a color expression conversion process of Exemplary Embodiment 2.

FIG. 11 schematically illustrates the color conversion process using the color conversion rule in addition to the color expression conversion process using the color expression conversion rule. The document data 100 transmitted from the terminal 10 includes map data as a venue map, and a description of each area illustrated in the venue map is included in the document data 100. The descriptions are illustrated as "area 1 is a resting space", "area 2 is a waiting space", and "part with violet text is subject to change". The description "area 2 is a waiting space" is illustrated in violet. In FIG. 11, a dotted line hatched area 106 indicates a part in violet.

In the case of printing and outputting such document data in the image forming apparatus 14, a person having difficulty in specific color perception sees violet color as blue color in a case where the person views the printed matter. Thus, the description "area 2 is a waiting space" is seen in blue color. Thus, even in a case where the description "part with violet text is subject to change" is illustrated below the description "area 2 is a waiting space", there is no part with violet text, and the person may be confused.

Therefore, the color conversion control unit 12f extracts color data of violet from the document data 100, and performs color conversion of violet→yellow by referring to the table 20 defining the color conversion rule. Accordingly, the description "area 2 is a waiting space" is illustrated in yellow color. In FIG. 11, a dotted line hatched area 108 indicates a part in yellow color.

In addition, the color expression conversion control unit 12d extracts a noun word "violet" from the document data 100, and performs word replacement of "violet"→"yellow" by referring to the table 18 defining the color expression conversion rule. Accordingly, the word "violet" is converted into a word "yellow", and the description "part with violet text is subject to change" is converted into a description "part with yellow text is subject to change". In FIG. 11, it is noted that a color textual expression part 110 is converted from "violet" into "yellow". The image forming apparatus 14 prints and outputs the document data 100 in which the color and the color expression are converted.

In a case where a person having difficulty in specific color perception views the printed matter, the description "area 2 is a waiting space" is seen in yellow color. Since the description "part with yellow text is subject to change" is illustrated below the description "area 2 is a waiting space", the color that is seen matches the color of the description.

Figure 12:
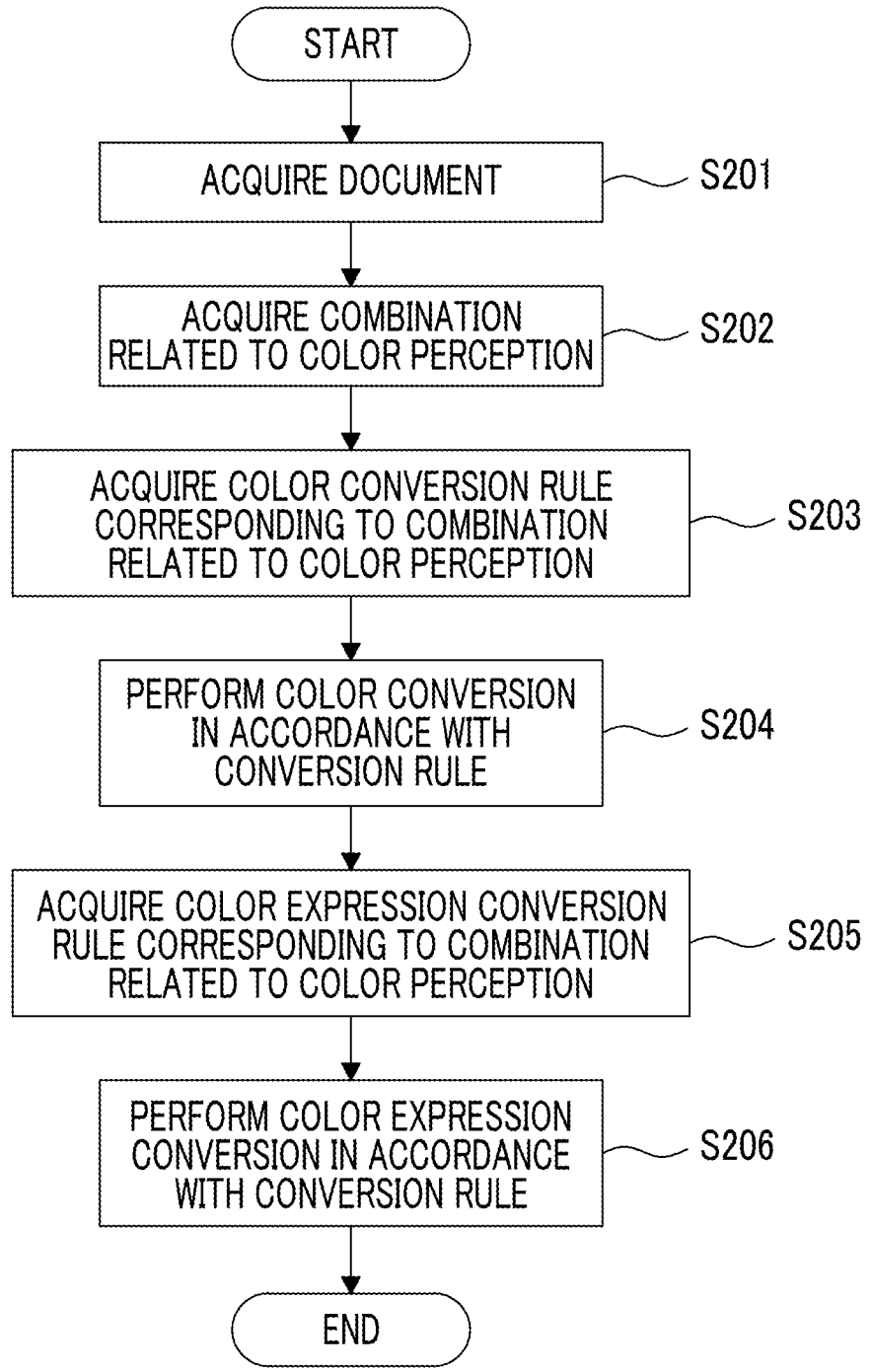
FIG. 12 is an overall process flowchart of Exemplary Embodiment 2.

FIG. 12 is a process flowchart executed in the server 12. In a case where the image forming apparatus 14 functions as the color expression conversion apparatus, the process is executed in the image forming apparatus 14. It is assumed that the server manager stores the color conversion rules and the color expression conversion rules in advance in the color conversion rule storage unit 12e and the color expression conversion rule storage unit 12c, respectively.

In a case where the document data acquiring unit 12a acquires the document data (S201), a combination that is related to color perception of the user is acquired from the user information (for example, the user ID) that is associated with the document data (S202).

Next, the color conversion control unit 12f acquires the color conversion rule corresponding to the combination related to color perception by referring to the color conversion rule storage unit 12e using the combination that is related to color perception and acquired in S202 (S203). For example, in a case where the combination related to color perception includes the assumed user as a person having normal color perception and the actual user as having monochromacy, the color conversion rule for monochromacy is acquired from the multiple color conversion rules (refer to FIG. 10).

The color conversion control unit 12f converts the color in the document data in accordance with the acquired color conversion rule, and outputs the document data to the color expression conversion control unit 12d (S204).

Next, the color expression conversion control unit 12d acquires the color expression conversion rule corresponding to the combination related to color perception by referring to the color expression conversion rule storage unit 12c using the combination that is related to color perception and acquired in S202 (S205). For example, in a case where the combination related to color perception includes the assumed user as a person having normal color perception and the actual user as having monochromacy, the color expression conversion rule for monochromacy is acquired from the multiple color expression conversion rules (refer to FIG. 5).

The color expression conversion control unit 12d converts the color expression in the document data in accordance with the acquired color expression conversion rule, and outputs the document data to the image forming apparatus 14 (S206).

In the flowchart in FIG. 12, while the color expression is converted after the color is converted, the color may be converted after the color expression is converted, or these processes may be executed in parallel, as described above.

In such a manner, the present exemplary embodiment focuses on a textual expression of a color and the color in the document data, and converts the textual expression of the color into another textual expression and also converts the color into another color. Thus, the color viewed by the user and the textual expression of the color matches.

Exemplary Embodiment 3

While the color expression in the document data is converted in Exemplary Embodiment 1 and Exemplary Embodiment 2, the original color expression before conversion may be added in association with the color expression after conversion in a case where the color expression is converted.

Figure 13:
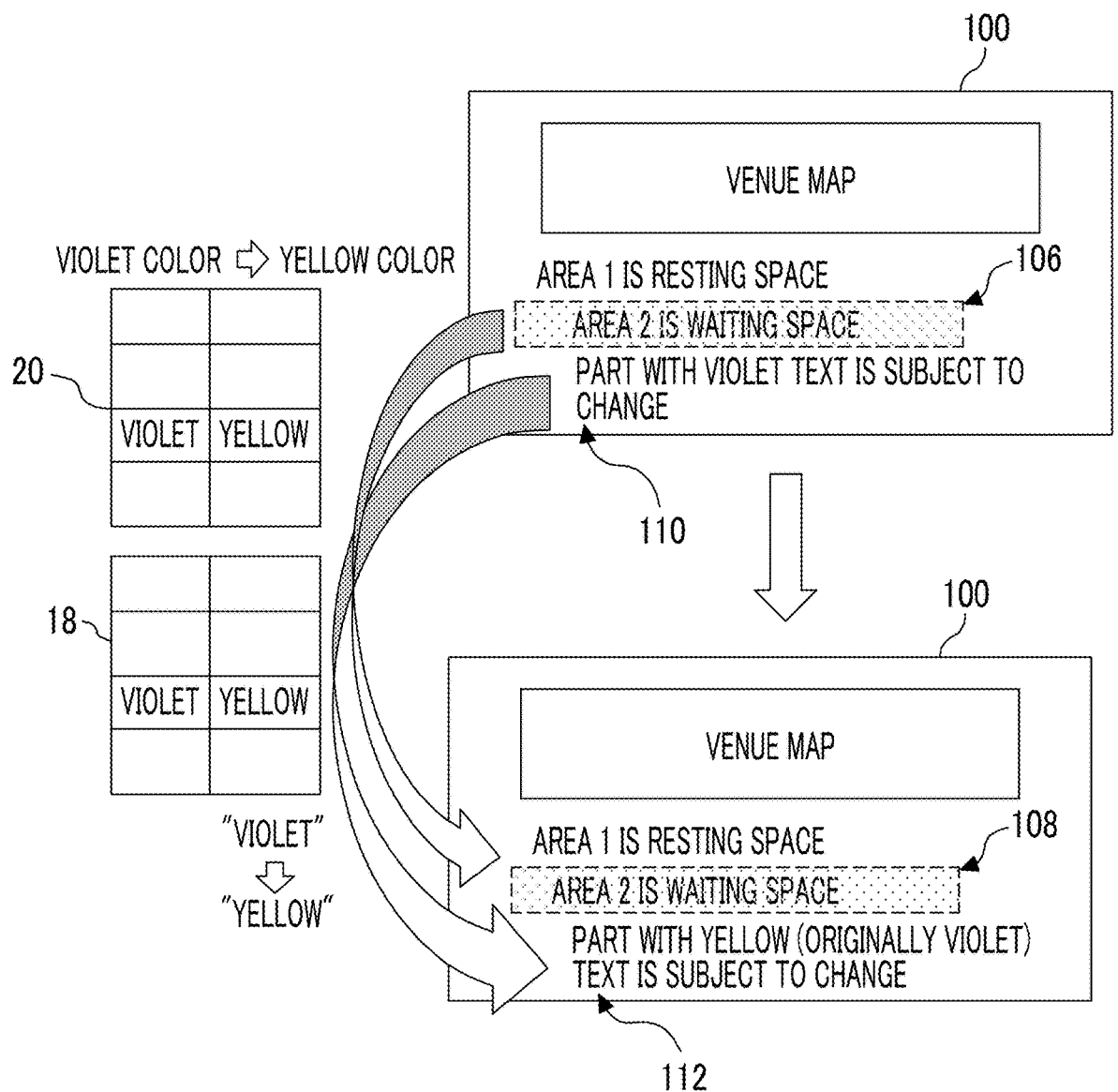
FIG. 13 is a descriptive diagram of a color conversion process and a color expression conversion process of Exemplary Embodiment 3.

FIG. 13 schematically illustrates a process of adding the original color expression. The difference from FIG. 11 is that the color expression in the document data 100 is converted from the description "part with violet text is subject to change" into the description "part with yellow text is subject to change", and the word "violet" that is the original color expression is added at a position adjacent to the word "yellow" that is the color expression after conversion. Thus, the converted description is "part with yellow (originally violet) text is subject to change". In FIG. 13, a text string 112 of "(originally violet)" is added at a position adjacent to the color expression "yellow" on the right side.

FIG. 14 is a process flowchart of the server 12 in the present exemplary embodiment. Processes of S301 to S306 are the same as the processes of S201 to S206 illustrated in FIG. 12. In the present exemplary embodiment, after the color expression is converted, the color expression conversion control unit 12d adds the original color expression before conversion at a position adjacent to the color expression after conversion in association with the color expression after conversion, and outputs the document data to the image forming apparatus 14 (S307).

In FIG. 13, while the color expression before conversion is added at a position adjacent to the color expression after conversion on the right side, that is, a position subsequent to the color expression after conversion, the color expression before conversion may be added at other various positions.

FIGS. 15A to 15E illustrate several examples of adding the original color expression before conversion.

FIG. 15A is a case where the original color expression before conversion is parenthesized and added at a position adjacent to the color expression after conversion on the left side, that is, immediately before the color expression after conversion.

FIG. 15B is a case where the original color expression before conversion is parenthesized and added at a position adjacent to the color expression after conversion on the upper side.

FIG. 15C is a case where the original color expression before conversion is parenthesized and added at a position adjacent to the color expression after conversion on the lower side.

FIG. 15D is a case where the original color expression before conversion of which the font is changed is added with a specific sign (in FIG. 15D, *) at a position adjacent to the color expression after conversion on the upper side.

FIG. 15E is a case where the original color expression before conversion in a balloon format is added at a position adjacent to the color expression after conversion on the upper side. Besides the balloon format, an annotation or a comment format may be used.

The side of the color expression after conversion on which the original color expression before conversion is added may be dynamically changed depending on the layout of the text.

Exemplary Embodiment 4

While the case of outputting the document data in the image forming apparatus 14 is described in Exemplary Embodiment 1, a display device instead of the image forming apparatus 14 in FIG. 1 may be connected to the communication network 16, and the document data processed in the server 12 may be output to the display device to display the document.

Figure 16:
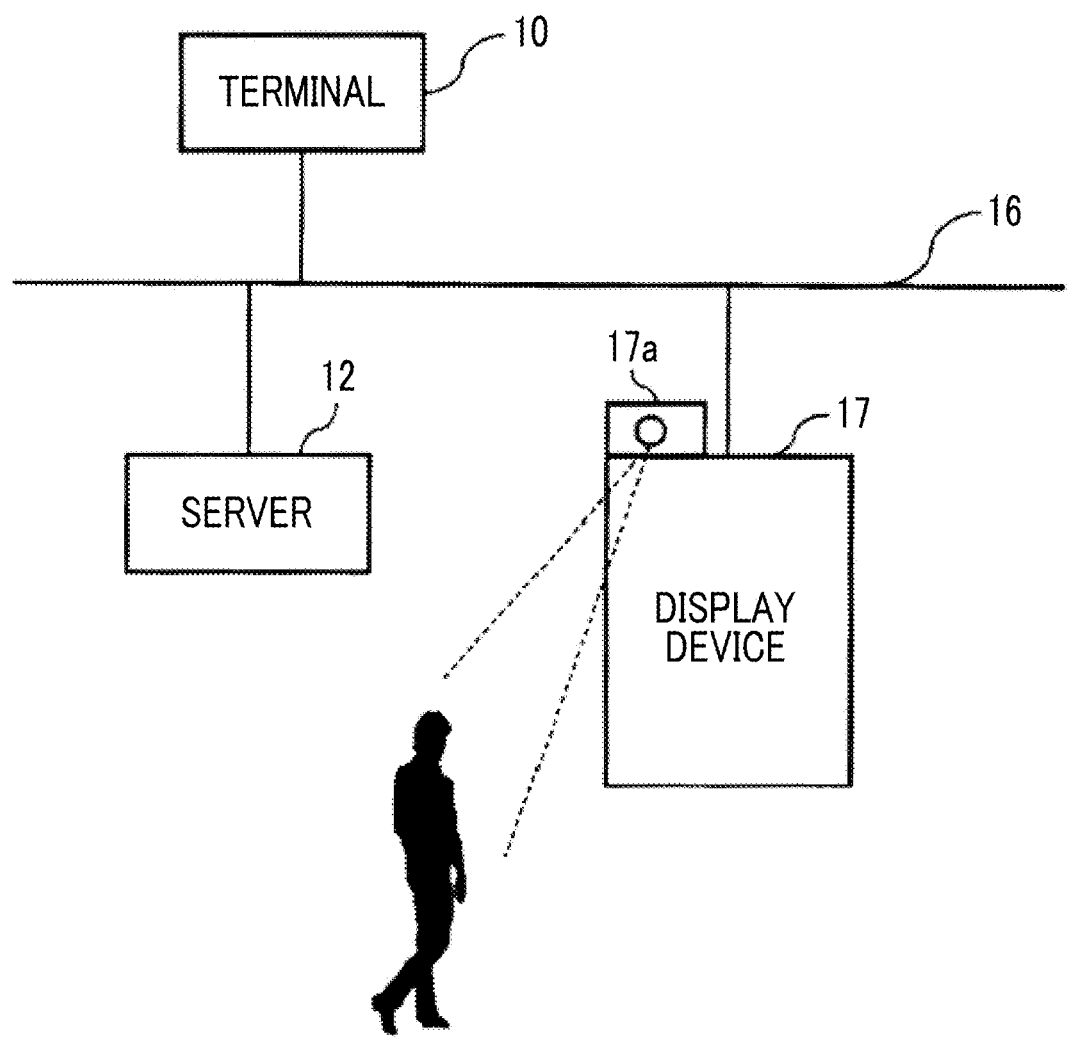
FIG. 16 is a system configuration diagram of Exemplary Embodiment 4.

FIG. 16 illustrates a system configuration diagram of the present exemplary embodiment. The system includes the terminal 10, the server 12, and a display device 17. The terminal 10, the server 12, and the display device 17 are connected to each other through the communication network 16 in a manner capable of transmitting and receiving data.

The terminal 10 transmits the document data to be displayed by the display device 17 to the server 12 through the communication network 16.

The server 12 is, for example, a management server or a cloud server and functions as a color expression conversion apparatus. The server 12 receives the document data from the terminal 10 through the communication network 16, and determines whether or not to execute a color expression conversion process on the document data. In a case where the server 12 determines to execute the color expression conversion process, the server 12 executes the conversion process on a specific color expression in the document data, and then, transmits the document data to the display device 17 through the communication network 16. In addition, in a case where the server 12 determines not to execute the color conversion process, the server 12 transmits the document data to the display device 17 through the communication network 16 without executing the color expression conversion process on the document data.

The display device 17 is configured with a liquid crystal display, an organic EL display, an LED display, or the like. The display device 17 receives the document data from the server 12 through the communication network 16, and displays the document data.

The display device 17 includes a camera 17a, captures an image of a person who views the display device 17, and transmits the image to the server 12.

The server 12 analyzes the image acquired in the camera 17a, and identifies the presence of difficulty in color perception and the type and the degree of difficulty in color perception of the viewer who views the display device 17. For example, in a case where the viewer carries an ID card or the like, and the ID card shows information indicating difficulty in color perception, whether the viewer is a person having normal color perception or a person having difficulty in color perception may be identified by extracting and analyzing the ID card from the acquired image. In a case where the server 12 determines that the viewer is a person having normal color perception, the server 12 outputs the document data to the display device 17 without converting the color expression in the document data. The display device 17 displays the document data in which the original color expression is not converted.

Meanwhile, in a case where the server 12 determines that the viewer is a person having difficulty in color perception, the server 12 converts the color expression in the document data into another color expression in accordance with the table 18, and outputs the document data to the display device 17. The display device 17 displays the document data in which the color expression is converted.

In addition to the color expression, the server 12 may convert the color using the table 20 in the same manner as Exemplary Embodiment 2.

Figure 17:
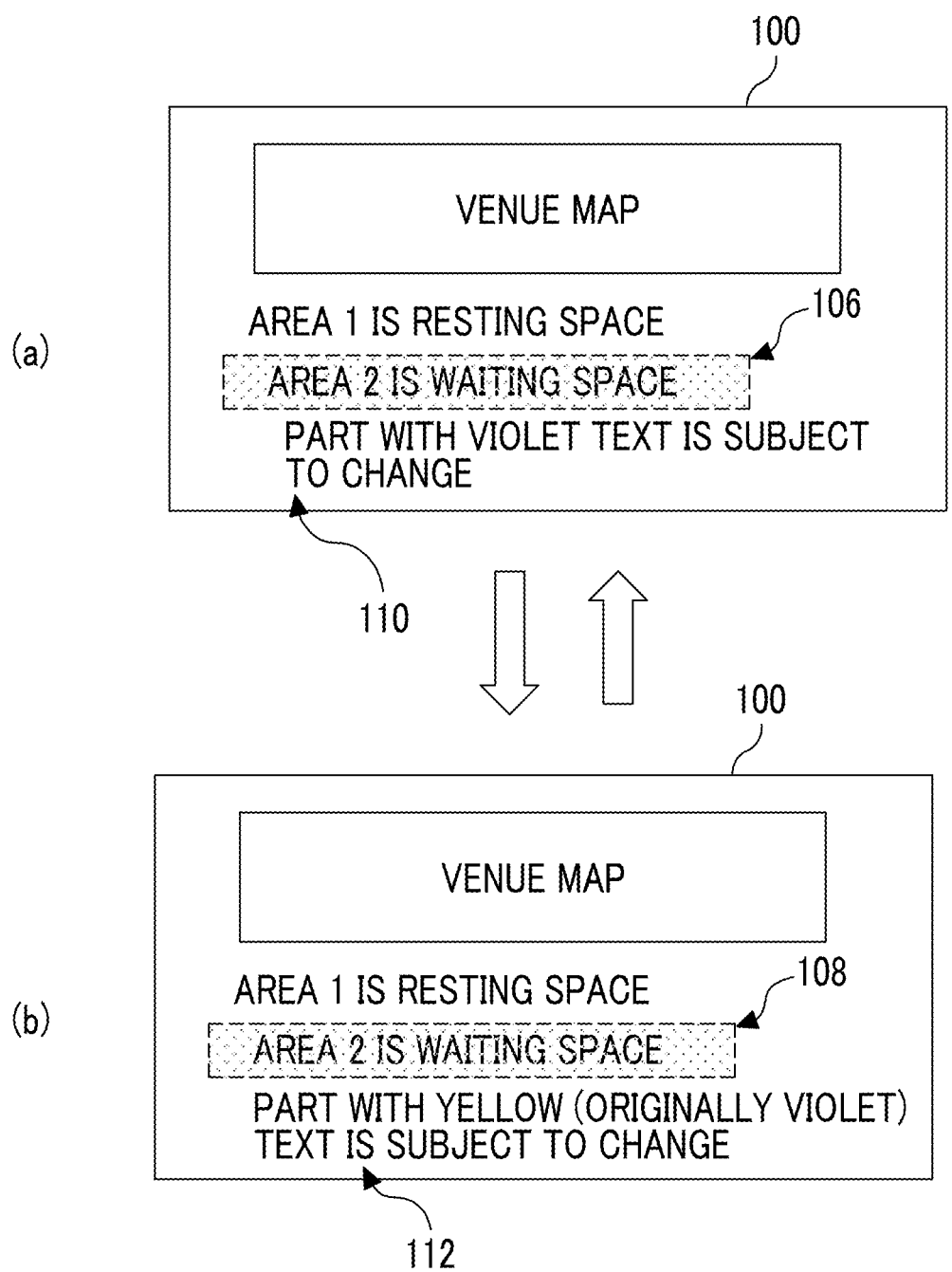
FIG. 17 is a descriptive diagram of a color conversion process and a color expression conversion process of Exemplary Embodiment 4.

FIG. 17 illustrates the document data 100 that is displayed on the display device 17 in a case where the viewer is a person having normal color perception, and a case where the viewer is a person having difficulty in color perception.

A part (a) in FIG. 17 is the case where the viewer is a person having normal color perception. The description "area 2 is a waiting space" is displayed in violet, and the description "part with violet text is subject to change" is displayed below the description "area 2 is a waiting space".

A part (b) in FIG. 17 is the case where the viewer is a person having difficulty in color perception. The description "area 2 is a waiting space" is displayed in yellow, and the description "part with yellow text is subject to change" is displayed below the description "area 2 is a waiting space". Furthermore, the original color expression before conversion is parenthesized and added immediately after the color expression after conversion.

A transition may be dynamically made between the display in the part (a) in FIG. 17 and the display in the part (b) in FIG. 17. That is, the part (a) in FIG. 17 is displayed in a case where the viewer is a person having normal color perception, and the part (b) in FIG. 17 is displayed in a case where the viewer is a person having difficulty in color perception.

In a case where multiple viewers are present, the server 12 may dynamically change the display of the part (a) in FIG. 17 and the part (b) in FIG. 17 depending on the distribution of the number of viewers. For example, in a case where two viewers including a person having normal color perception and a person having difficulty in color perception are present, the part (a) in FIG. 17 and the part (b) in FIG. 17 are alternately displayed at a certain time interval. In a case where viewers including m persons having normal color perception and n persons having difficulty in color perception are present, the part (a) in FIG. 17 and the part (b) in FIG. 17 are alternated at a time ratio of m:n.

The display device 17 may be a large screen or the like that is installed in a public location, or may be configured as digital signage that displays an advertisement as the document data 100. The system illustrated in FIG. 16 may be installed in a venue of an exposition or a competition (such as the Paralympics (registered trademark)).

While the exemplary embodiments of the present invention are described thus far, the present invention is not limited to the exemplary embodiments, and various modifications may be made. Hereinafter, modification examples will be described.

Modification Example 1

While a rule that corresponds to a person having difficulty in color perception is defined as the color expression conversion rule in the exemplary embodiments, the way of seeing color may be different due to a cultural difference and the like for a person other than the person having difficulty in color perception. For example, a color that is expressed as "blue color" by a person belonging to a certain cultural area may be expressed as "green color" by a person belonging to another cultural area even though the color is the same. Such a difference is not caused by the presence of difficulty in color perception and is a difference in the way of expressing the same color.

Therefore, the color expression conversion rule storage unit 12c may store a rule corresponding to a cultural difference instead of the rule corresponding to difficulty in color perception or in addition to the rule corresponding to difficulty in color perception. The color expression conversion control unit 12d selects an appropriate rule from the rules and converts the color expression depending on the user who views the printed matter to be output from the image forming apparatus 14. For example, in a case where the user assumed by the writer of the document data belongs to a certain cultural area A, and the actual user of the document output from the image forming apparatus 14 belongs to another cultural area B, color is expressed by applying a rule that corresponds to the combination of the cultural area A and the cultural area B.

In a case where a textual expression of a color is different between the assumed user of the document data and the actual user of the document data, the color expression conversion rule based on difficulty in color perception, a cultural difference, or the like may be a rule for matching the textual expression of the former and the textual expression of the latter. The cultural difference includes a difference in ethnic group, age, sex, and area of residence.

Modification Example 2

While the actual user of the display device 17 is identified by capturing an image of the user by the camera 17a in Exemplary Embodiment 4, a data transmitting and receiving unit may be disposed in the display device 17, and the user may be identified by acquiring information related to the user by short-range communication with an information terminal such as a smartphone carried by the user. In a case where the user directs the smartphone toward the display device 17, data is transmitted and received between the display device 17 and the smartphone, and the form of display of the display device 17 is changed to the part (b) in FIG. 17 from the part (a) in FIG. 17 based on the identification of the user. The color expression is actively changed depending on the intention of the user.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color expression conversion apparatus comprising:
    a memory configured to store a rule for converting a textual expression of a specific color from one textual expression to another textual expression,
    a processor configured to, coupled to the memory, convert from a first text string corresponding to a first color included in document data into a second text string corresponding to a second color in accordance with the rule stored in the memory without converting the color included in the document data, wherein the first text string is a first word expressing the first color being perceived by a first user, the second text string is a second word expressing the second color being perceived by a second user, the first word and the second word are different words;

convert the textual expression from the first text string corresponding to the first color included in document data into the second text string corresponding to the second color in response to having determined that the first user created the document data having assumed the second user to having normal color perception and the second user having difficulty in color perception, not convert the textual expression of from the first text string corresponding to the first color included in document data into the second text string corresponding to the second color in response to having determined that the first user created the document data having assumed the second user to having normal color perception and the second user having normal color perception, and not convert the textual expression of from the first text string corresponding to the first color included in document data into the second text string corresponding to the second color in response to having determined that the first user created the document data having assumed the second user to having difficulty in color perception and the second user having difficulty in color perception.

2. The color expression conversion apparatus according to claim 1, wherein in a case where the textual expression of the first color is different between an assumed user of the document data and an actual user of the document data, the rule is a rule for matching the textual expression of the assumed user and the textual expression of the actual user.

3. The color expression conversion apparatus according to claim 1,
wherein the processor is further configured to perform sentence structure parsing on the document data and extract a word in the document data, and
convert the extracted word in accordance with the rule in a case where the extracted word matches a word that is defined in the rule.

4. The color expression conversion apparatus according to claim 2,
wherein the assumed user is a user who belongs to a certain cultural area, and the actual user is a user who belongs to a different cultural area.

5. The color expression conversion apparatus according to claim 4,
wherein the processor is further configured to perform sentence structure parsing on the document data and extract a word in the document data, and
convert the extracted word in accordance with the rule in a case where the extracted word matches a word that is defined in the rule.

6. The color expression conversion apparatus according to claim 4, wherein the processor is further configured to:
store a rule in the memory for converting a specific color into another color; and
convert a color included in the document data into another color in accordance with the rule.

7. The color expression conversion apparatus according to claim 2,
wherein the processor is further configured to perform sentence structure parsing on the document data and extract a word in the document data, and
convert the extracted word in accordance with the rule in a case where the extracted word matches a word that is defined in the rule.

8. The color expression conversion apparatus according to claim 7, wherein the processor is further configured to:
store a rule in the memory for converting a specific color into another color; and
convert a color included in the document data into another color in accordance with the rule.

9. The color expression conversion apparatus according to claim 2, wherein the processor is further configured to:
store a rule in the memory for converting a specific color into another color; and
convert a color included in the document data into another color in accordance with the rule.

10. The color expression conversion apparatus according to claim 2, wherein the processor is further configured to:
identify the actual user, and
perform a conversion in accordance with the rule that corresponds to the identified actual user.

11. The color expression conversion apparatus according to claim 1,
wherein the processor is further configured to perform sentence structure parsing on the document data and extract a word in the document data, and
convert the extracted word in accordance with the rule in a case where the extracted word matches a word that is defined in the rule.

12. The color expression conversion apparatus according to claim 11, wherein the processor is further configured to:
store a rule in the memory for converting a specific color into another color; and
convert a color included in the document data into another color in accordance with the rule.

13. The color expression conversion apparatus according to claim 1, wherein the processor is further configured to:
store a rule in the memory for converting a specific color into another color; and
convert a color included in the document data into another color in accordance with the rule.

14. The color expression conversion apparatus according to claim 1, wherein the processor is further configured to:
add the textual expression of the color before conversion in association with the textual expression after conversion.

15. The color expression conversion apparatus according to claim 14, wherein the processor is further configured to add the textual expression of the color before conversion at a position adjacent to the textual expression after conversion.

16. The color expression conversion apparatus according to claim 1,
wherein the processor is further configured to communicate with a printer configured to print and output the document data converted by the processor.

17. The color expression conversion apparatus according to claim 1, further comprising:
a display device that outputs the document data converted by the processor.

18. The color expression conversion apparatus according to claim 1, wherein in a case where the first text string is 'red' and the second user has a difficulty perceiving red, the second text string is 'brown'.

19. A non-transitory computer readable medium storing a program causing a computer to execute:
acquiring document data, referring to a memory configured to store a rule for converting a textual expression of a specific color from one textual expression to another textual expression, and performing output by converting from a first text string corresponding to a first color included in the document data into a second text string corresponding to a second color in accordance with the rule stored in the memory without converting the color included in the document data, wherein the first text string is a first word expressing the first color being perceived by a first user, the second text string is a second word expressing the second color being perceived by a second user, the first word and the second word are different words;

converting the textual expression from the first text string corresponding to the first color included in document data into the second text string corresponding to the second color in response to having determined that the first user created the document data having assumed the second user to having normal color perception and the second user having difficulty in color perception, not converting the textual expression of from the first text string corresponding to the first color included in document data into the second text string corresponding to the second color in response to having determined that the first user created the document data having assumed the second user to having normal color perception and the second user having normal color perception, and not converting the textual expression of from the first text string corresponding to the first color included in document data into the second text string corresponding to the second color in response to having determined that the first user created the document data having assumed the second user to having difficulty in color perception and the second user having difficulty in color perception.

\* \* \* \* \*